United States Patent
Abe et al.

(10) Patent No.: US 9,113,090 B2
(45) Date of Patent: Aug. 18, 2015

(54) IMAGING DEVICE AND IMAGING METHOD FOR COMBINING PLURAL CAPTURED IMAGES INTO SINGLE IMAGE

(71) Applicant: Panasonic Corporation, Osaka (JP)

(72) Inventors: Mitsuo Abe, Osaka (JP); Hirofumi Ishii, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 157 days.

(21) Appl. No.: 13/958,719

(22) Filed: Aug. 5, 2013

(65) Prior Publication Data

US 2013/0314563 A1 Nov. 28, 2013

Related U.S. Application Data

(63) Continuation of application No. PCT/JP2012/004839, filed on Jul. 30, 2012.

(30) Foreign Application Priority Data

Dec. 22, 2011 (JP) .................................. 2011-280939

(51) Int. Cl.
H04N 5/235 (2006.01)
H04N 5/232 (2006.01)

(52) U.S. Cl.
CPC .......... H04N 5/2355 (2013.01); H04N 5/23245 (2013.01)

(58) Field of Classification Search
None
See application file for complete search history.

(56) References Cited

U.S. PATENT DOCUMENTS

| 6,529,640 B1 | 3/2003 | Utagawa et al. |
| 7,098,946 B1 | 8/2006 | Koseki et al. |
| 7,646,414 B2 | 1/2010 | Koseki et al. |
| 8,081,208 B2 | 12/2011 | Inomata et al. |
| 8,115,830 B2 | 2/2012 | Kato et al. |
| 2002/0051072 A1 | 5/2002 | Sumitomo et al. |
| 2006/0250515 A1 | 11/2006 | Koseki et al. |
| 2008/0088710 A1* | 4/2008 | Iwamoto et al. ........... 348/220.1 |
| 2008/0297597 A1 | 12/2008 | Inomata et al. |
| 2009/0174795 A1 | 7/2009 | Kato et al. |
| 2009/0251591 A1* | 10/2009 | Whitham ...................... 348/362 |
| 2012/0026365 A1* | 2/2012 | Shinoda ................... 348/231.99 |

FOREIGN PATENT DOCUMENTS

| JP | 8-214211 | 8/1996 |
| JP | 2000-78463 | 3/2000 |
| JP | 2000-92378 | 3/2000 |

(Continued)

OTHER PUBLICATIONS

International Search Report of PCT Application No. PCT/JP2012/004839 dated Sep. 11, 2012.

*Primary Examiner* — Justin P Misleh
(74) *Attorney, Agent, or Firm* — Panasonic Patent Center (57) ABSTRACT

An imaging device is configured so that the user can select either automatic determination mode or selection mode. In automatic determination mode, when a first combination imaging mode is selected for capturing and combining a plurality of sets of image data, the number of sets of image data to be combined is set to a specific first number of combinations. In selection mode, when a second combination imaging mode is selected for capturing a plurality of sets of image data, the number of sets of image data to be combined is set to a specific second number of combinations. The first number of combinations is set to be different from the second number of combinations.

10 Claims, 5 Drawing Sheets

(56) References Cited

FOREIGN PATENT DOCUMENTS

| JP | 2002-77713 | 3/2002 |
| JP | 2006-229690 | 8/2006 |
| JP | 2008-301332 | 12/2008 |
| JP | 2009-111886 | 5/2009 |
| JP | 2009-159092 | 7/2009 |

\* cited by examiner

IMAGING DEVICE AND IMAGING METHOD FOR COMBINING PLURAL CAPTURED IMAGES INTO SINGLE IMAGE

CROSS-REFERENCE TO RELATED APPLICATIONS

This application is a continuation application of International Application No. PCT/JP2012/004839, filed Jul. 30, 2012, designating the United States and claiming priority to Japanese Patent Application No. 2011-280939 filed on Dec. 22, 2011, and the entire contents of both applications is incorporated herein by reference.

BACKGROUND

1. Technical Field

The technology disclosed herein relates to an imaging device with which it is possible to combine a plurality of sets of captured image data into a single set of image data.

2. Background Information

Today's digital cameras sometimes have the function of continuous combination processing. With a function of continuous combination processing, a plurality of images are continuously captured and combined into a single image. Japanese Laid-Open Patent Application H8-214211, for example, discloses a method for producing a single image with a wide dynamic range by combining a plurality of images captured at different exposure settings in an environment with a large brightness difference, such as when the subject is backlit. This combination processing aimed at expanding the dynamic range is also called high dynamic range combination (hereinafter referred to as HDR combination).

The user of a digital camera is able to select a mode for performing continuous combination processing as one imaging mode. Also, a digital camera may have an automatic scene determination mode for automatically determining the scene according to the state of the subject being captured, and continuous combination processing may be selected in this automatic scene determination mode.

With the conventional digital camera discussed above, when continuous combination processing is selected in automatic scene determination mode, there is the risk that continuous capture will be performed at a timing unintended by the user. Also, since combination processing is carried out after continuous capture, a problem is that it takes a long time until the user can perform the next imaging operation.

The present technology was conceived in light of the above problem, and it is an object thereof to make an imaging device that is capable of continuous combination processing more convenient to use.

SUMMARY

An imaging device disclosed herein is configured to allow selection between an automatic determination mode in which one of a plurality of imaging modes is automatically decided on, and a selection mode in which one of a plurality of imaging modes is selectively decided on. If a first combination imaging mode in which a plurality of sets of image data are captured and combined is selected in the automatic determination mode, the number of sets of image data to be combined is set to a specific first number of combinations. If a second combination imaging mode in which a plurality of sets of image data are captured and combined is selected in the selection mode, the number of sets of image data to be combined is set to a specific second number of combinations. The first number of combinations is set to be different from the second number of combinations.

With the present technology, an imaging device that is capable of continuous combination processing is made more convenient to use.

BRIEF DESCRIPTION OF THE DRAWINGS

Referring now to the attached drawings, which form a part of this original disclosure.

DETAILED DESCRIPTION OF EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

An embodiment of the present technology will be described through reference to the drawings. In the description of the drawings that follows, portions that are the same or similar will be numbered the same or similarly. The drawings are merely schematic representations, however, and the proportions of the various dimensions and so forth may be different from those in actuality. Therefore, the specific dimensions and so forth should be determined by referring to the following description. Also, the mutual dimensional relations and proportions among the drawings may, of course, may vary in some portions.

In the following embodiment, a digital camera will be described as an example of an imaging device. Also, in the following description, assuming that the digital camera is in its normal orientation (hereinafter also referred to as landscape orientation), the direction facing the subject will be referred to as "forward," the direction facing away from the subject as "rearward," vertically upward as "upward," vertically downward as "downward," to the right in a state of facing directly at the subject as "to the right," and to the left in a state of facing directly at the subject as "to the left."

Embodiment

The digital camera 100 (an example of an imaging device) pertaining to this embodiment will be described through reference to FIGS. 1 to 4. The digital camera 100 is an imaging device capable of capturing both moving and still pictures.

1. Configuration of Digital Camera

Figure 1:
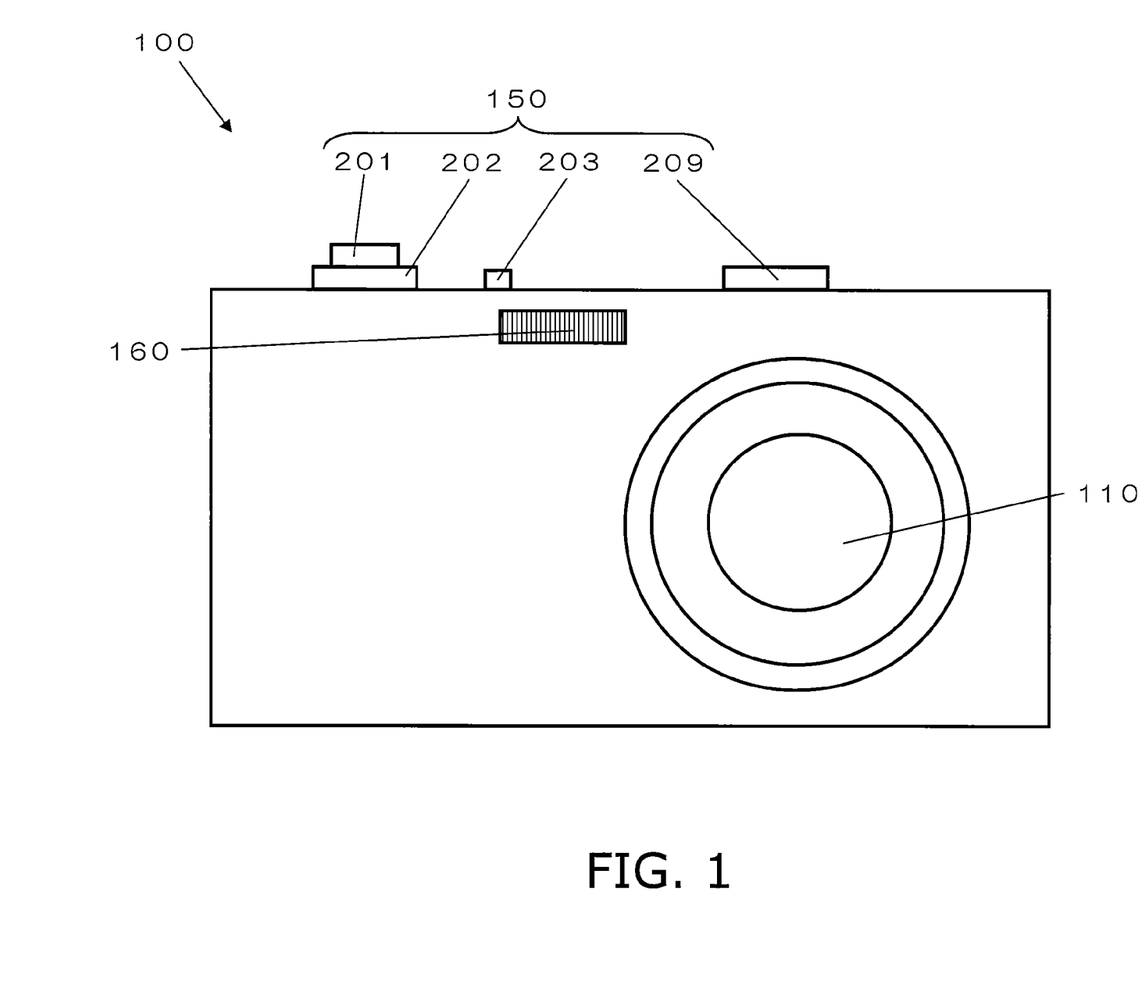
FIG. 1 is a front view of the digital camera pertaining to an embodiment.

FIG. 1 is a front view of the digital camera pertaining to an embodiment. As shown in FIG. 1, the front face of the digital camera 100 is equipped with a flash 160 and a lens barrel that holds an optical system 110. The digital camera 100 has on its top face a manipulation unit 150 that includes a still picture release button 201, a zoom lever 202, a power button 203, a scene switching dial 209, and so on.

Figure 2:
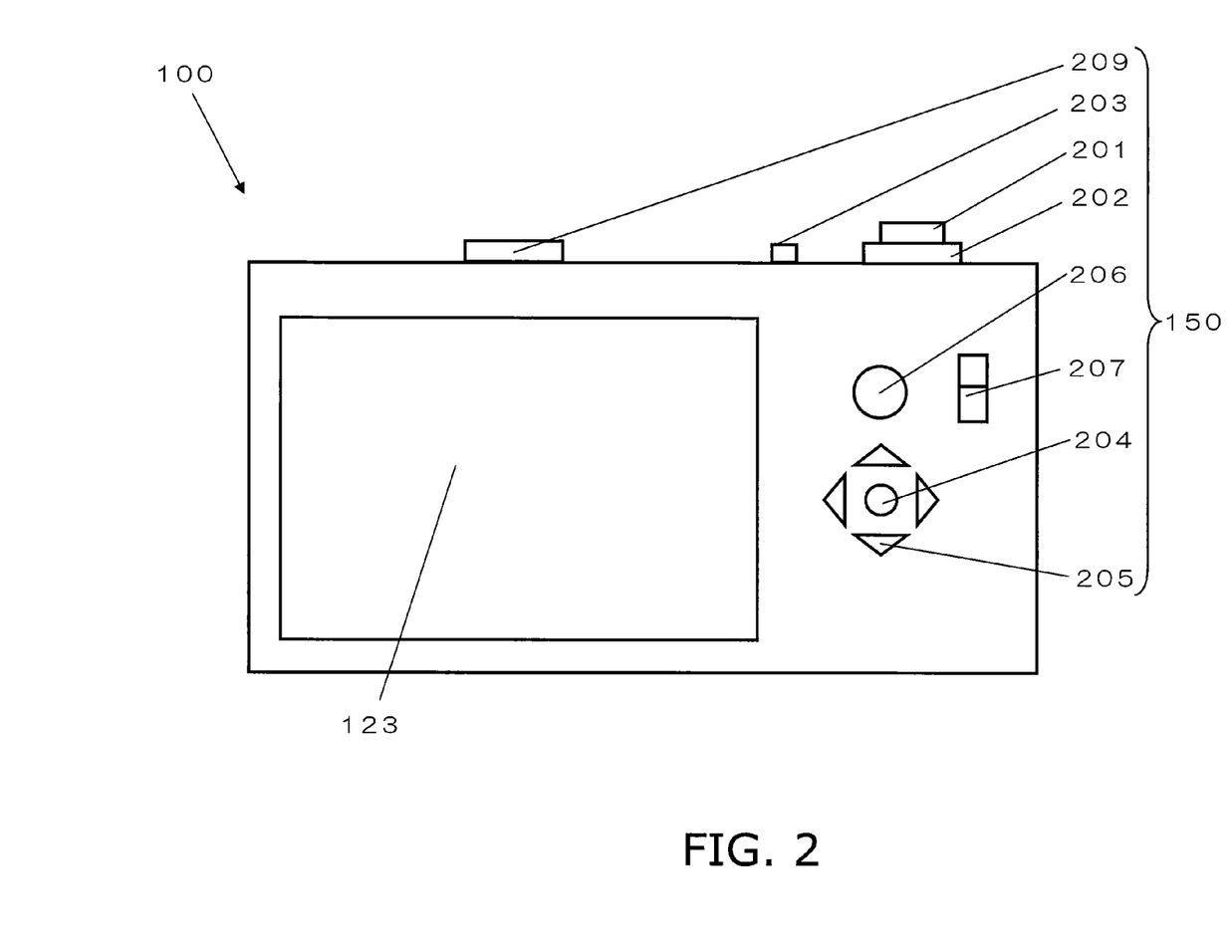
FIG. 2 is a rear view of the digital camera pertaining to this embodiment.

FIG. 2 is a rear view of the digital camera pertaining to the embodiment. As shown in FIG. 2, the rear face of the digital camera 100 is equipped with a liquid crystal monitor 123, a center button 204, directional buttons 205, a moving picture release button 206, a mode switch 207, an enter button, and so on.

Figure 3:
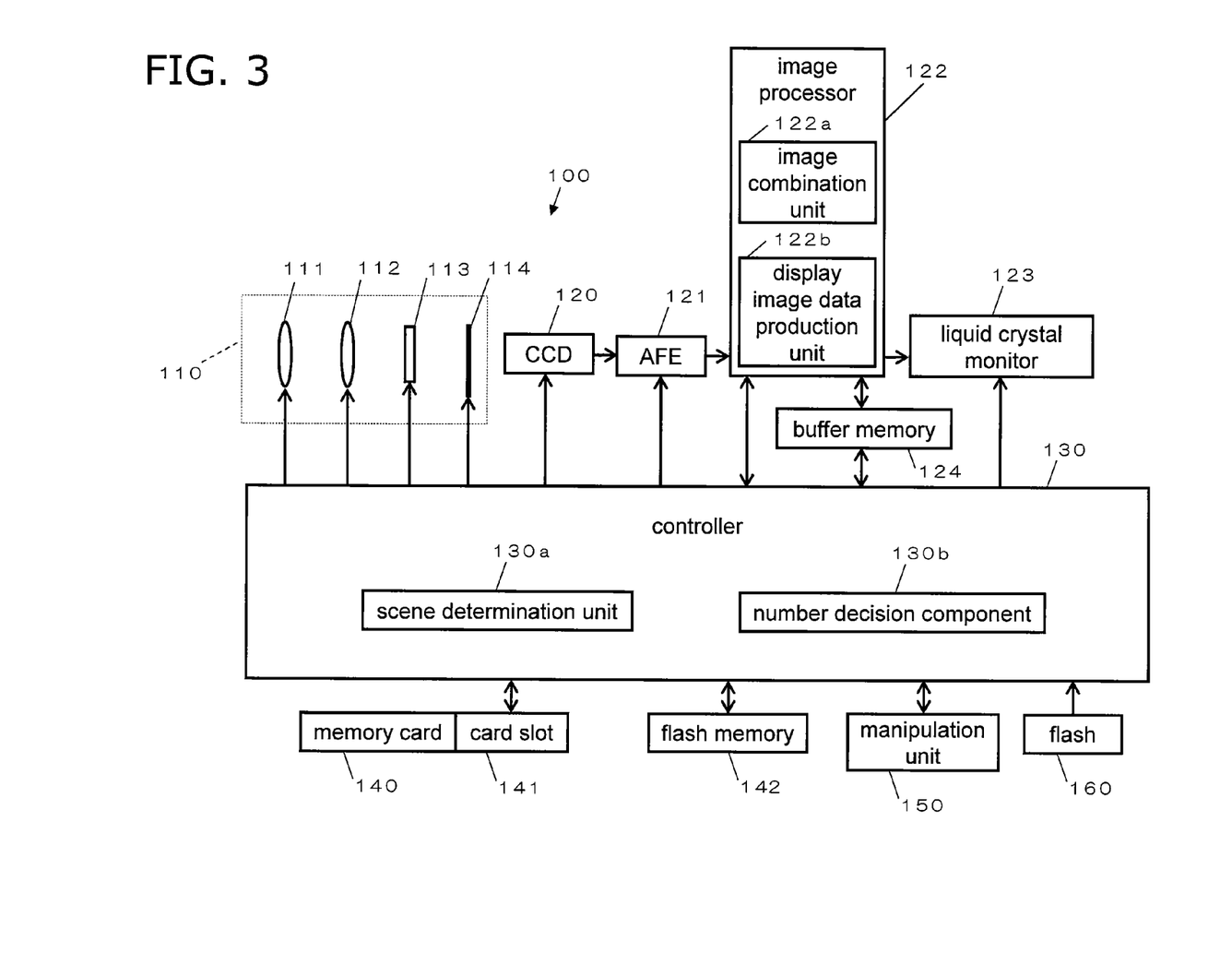
FIG. 3 is a block diagram of the digital camera pertaining to this embodiment.

FIG. 3 is a block diagram of the digital camera pertaining to this embodiment. As shown in FIG. 3, the digital camera 100 comprises the optical system 110, a CCD image sensor 120, an AFE (analog front end) 121, an image processor 122, a buffer memory 124, the liquid crystal monitor 123, a controller 130, a card slot 141, a memory card 140, a flash memory 142, the manipulation unit 150, and the flash 160.

The optical system 110 forms a subject image. The optical system 110 has a focus lens 111, a zoom lens 112, an aperture 113, and a shutter 114. In another embodiment, the optical system 110 may include an optical shake correcting lens which functions as an OIS (optical image stabilizer). Also, the lenses included in the optical system 110 may each be constituted by a number of lenses, or may be constituted by a number of groups of lenses.

The focus lens 111 is used to adjust the focal state of the subject. The zoom lens 112 is used to adjust the angle of field of the subject. The aperture 113 is used to adjust the amount of light that is incident on the CCD image sensor 120. The shutter 114 is used to adjust the exposure time with incident light on the CCD image sensor 120. The focus lens 111, the zoom lens 112, the aperture 113, and the shutter 114 are each driven by drive unit such as a DC motor, a stepping motor, or the like according to a control signal issued from the controller 130.

The CCD image sensor 120 (an example of an imaging component) is an imaging element that captures the subject image formed by the optical system 110. The CCD image sensor 120 produces a frame of image data depicting the subject image.

The AFE (analog front end) 121 subjects the image data produced by the CCD image sensor 120 to various processing. More specifically, the AFE 121 performs noise suppression by correlated double sampling, amplification to the input range width of an A/D converter by analog gain controller, A/D conversion by A/D converter, and other such processing.

The image processor 122 subjects the image data that has undergone various processing by the AFE 121 to various other processing. The image processor 122 subjects the image data to smear correction, white balance correction, gamma correction, YC conversion processing, electronic zoom processing, compression processing, reduction processing, enlargement processing, and other such processing. The image processor 122 produces a through-image and a recorded image by performing the above processing on the image data. In this embodiment, the image processor 122 is a microprocessor that executes programs. In another embodiment, however, the image processor 122 may be a hard-wired electronic circuit. The image processor 122 may also be constituted integrally with the controller 130 and so forth.

The image processor 122 executes the processing of an image combination unit 122a (an example of a combination processor) and the processing of a display-use image data production unit 122b on the basis of commands from the controller 130. When a plurality of sets of image data need to be combined, the image processor 122 executes the processing of the image combination unit 122a on the basis of a command from the controller 130. The processing of the image combination unit 122a and the processing of the display-use image data production unit 122b will be discussed below in detail.

The controller 130 controls the overall operation of the entire digital camera 100. The controller 130 is constituted by a ROM, a CPU, etc. In the ROM are stored programs related to file control, auto focus control (AF control), automatic exposure control (AE control), and light emission control over the flash 160, as well as programs for the overall control of the operation of the entire digital camera 100.

The controller 130 controls a scene determination unit 130a (an example of an imaging mode selector) and a number decision component 130b by having the CPU execute the programs stored in the ROM. The operation of the scene determination unit 130a and the number decision component 130b will be discussed below in detail.

The controller 130 records image data that has undergone various processing by the image processor 122 as still picture data or moving picture data to the memory card 140 and the flash memory 142 (hereinafter referred to as the "memory card 140, etc."). In this embodiment, the controller 130 is a microprocessor that executes programs, but in another embodiment may instead be a hard-wired electronic circuit. The controller 130 may also be constituted integrally with the image processor 122 and so forth.

The liquid crystal monitor 123 displays through-images, recorded images, and other such images. The through-images and recorded images are produced by the image processor 122. A through-image is a series of images produced continuously at specific time intervals while the digital camera 100 is set to imaging mode. More precisely, a series of image data corresponding to a series of images is produced by the CCD image sensor 120 at specific time intervals. The user can capture an image while checking the subject composition by referring to the through-image displayed on the liquid crystal monitor 123.

The recorded images are obtained by decoding (expanding) still picture data or moving picture data recorded to the memory card 140, etc. Recorded images are displayed on the liquid crystal monitor 123 when the digital camera 100 is set to reproduction mode. In another embodiment, an organic EL display or any other such display capable of displaying images may be used in place of the liquid crystal monitor 123.

The buffer memory 124 is a volatile storage medium that functions as the working memory for the image processor 122 and the controller 130. In this embodiment, the buffer memory 124 is a DRAM.

The flash memory 142 is an internal memory of the digital camera 100. The flash memory 142 is a non-volatile storage medium. The flash memory 142 has a customized category registration region and a current value holding region (not shown).

The memory card 140 is removably inserted into the card slot 141. The card slot 141 is connected electrically and mechanically to the memory card 140.

The memory card 140 is an external memory of the digital camera 100. The memory card 140 is a non-volatile storage medium.

The manipulation unit 150 is a manipulation interface that is operated by the user. The "manipulation unit 150" refers collectively to all the buttons, dials, and so forth disposed on the outer housing of the digital camera 100. The manipulation unit 150 includes the still picture release button 201, the moving picture release button 206, the zoom lever 202, the power button 203, the center button 204, directional buttons 205, and the mode switch 207. Upon receiving a user operation, the manipulation unit 150 immediately sends the controller 130 a signal corresponding to the operation.

The still picture release button 201 is a push-button switch for designating the timing for still picture recording. The moving picture release button 206 is a push-button switch for designating the timing to start and stop moving picture recording. The controller 130 directs the image processor 122 and so forth to produce still picture data or moving picture data according to the timing at which the release buttons 201 and 206 are pressed, and this data is stored in the memory card 140, etc.

The zoom lever 202 is a lever for adjusting the angle of field between the wide angle end and the telephoto end. The controller 130 drives the zoom lens 112 according to user operation of the zoom lever 202.

The power button 203 is a sliding switch for switching the power on and off to the various parts of the digital camera 100.

The center button 204 and the directional buttons 205 are push-button switches. The user manipulates the center button 204 and the directional buttons 205 to display various setting screens (including setting menu screens and quick setting menu screens that are not shown) on the liquid crystal monitor 123. The user can set the setting category values related to various imaging conditions and reproduction conditions on these setting screens.

The mode switch 207 is a sliding switch for switching the digital camera 100 between imaging mode and reproduction mode.

The scene switching dial 209 (an example of an imaging mode input component) is a dial for switching the scene mode. "Scene mode" refers collectively to the modes that are set according to the imaging situation. Factors that affect the imaging situation include the subject, the imaging environment, and so on. The scene switching dial 209 is used to set any one of a plurality of scene modes.

The plurality of scene modes include, for example, landscape mode, portrait mode, nighttime mode, shake-correctable nighttime mode, backlight mode, and automatic scene determination mode. The "portrait mode" is a mode suited to when capturing an image so that the skin tone of a person will have the proper coloring. The "shake-correctable nighttime mode" (handheld nighttime mode) is a mode suited to when the user captures an image in a state of low ambient light (in a dimly lit environment), without putting the digital camera 100 on a tripod or other fixing device. The "backlight mode" is a mode suited to when the user captures an image in an environment with a large brightness difference. Backlight mode is an example of a mode in which continuous combination processing is performed (first combination imaging mode and second combination imaging mode).

Here, when the automatic scene determination mode is selected, a mode is set automatically on the basis of image data from among landscape mode, portrait mode, nighttime mode, and handheld nighttime mode, for example.

2. Operation in Imaging Mode

Figure 4:
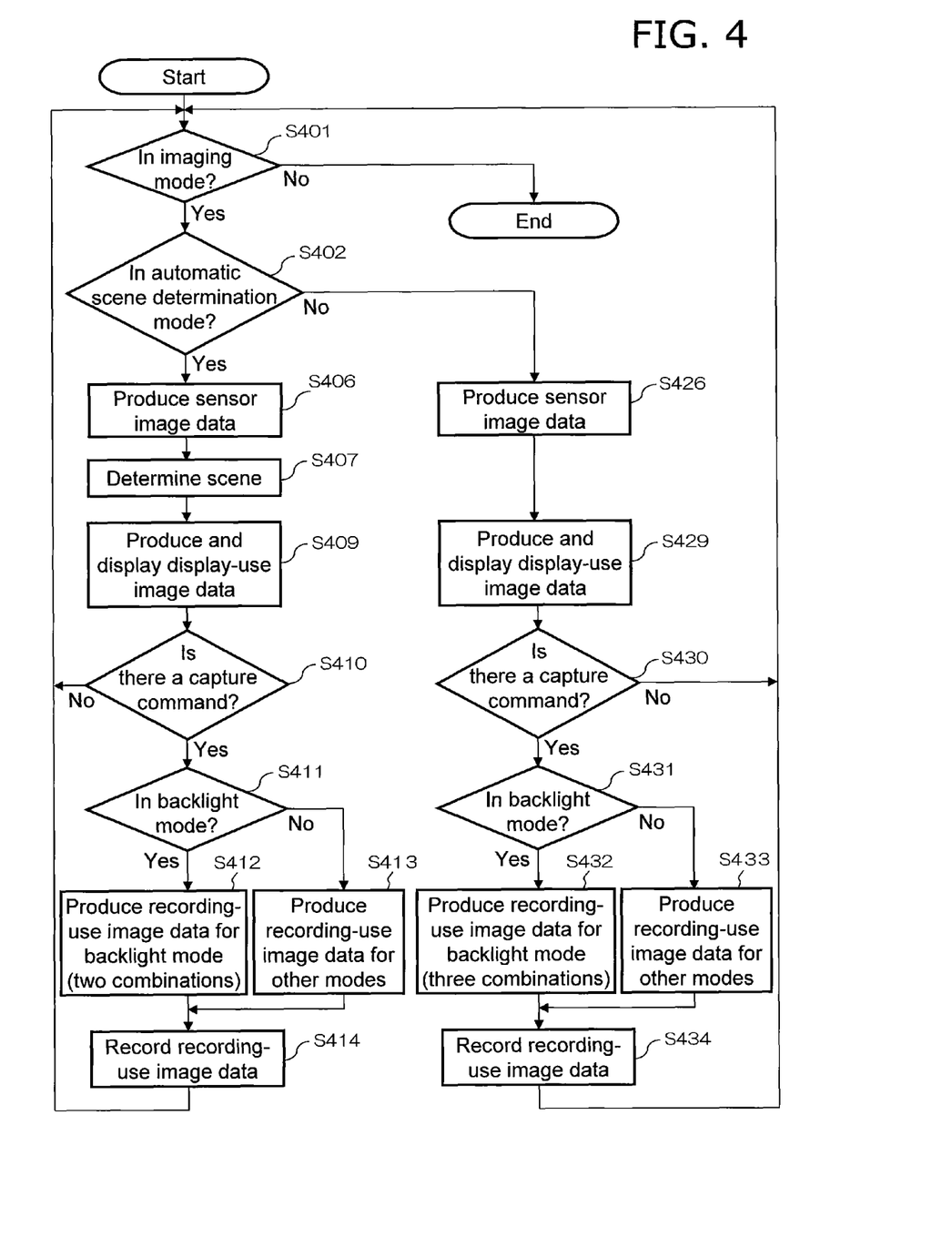
FIG. 4 is a flowchart showing the flow of processing by the digital camera in imaging mode in this embodiment.

FIG. 4 is a flowchart showing the flow of processing by the digital camera in imaging mode in this embodiment. The operation in imaging mode will now be described through reference to FIG. 4.

When the user switches on the power to the digital camera 100 with the power button 203, the controller 130 refers to the setting of the mode switch 207 (S401). More precisely, the controller 130 determines whether the setting on the mode switch 207 is imaging mode or reproduction mode. If the mode switch 207 has been set to the reproduction mode (No in S401), the controller 130 ends processing related to imaging mode.

If the mode switch 207 has been set to the imaging mode (Yes in S401), the controller 130 refers to the scene mode set with the manipulation unit 150 (S402). More precisely, the controller 130 determines whether or not the scene mode is the automatic scene determination mode.

Let us now describe the scene mode. A scene mode is selected from among a plurality of scene modes which are registered in the digital camera 100. For instance, if the user operates the manipulation unit 150 to select a mode other than the automatic scene determination mode, the scene mode selected here is recognized by the controller 130. More specifically, a scene mode is selected from among landscape mode, portrait mode, nighttime mode, handheld nighttime mode, backlight mode, and so forth by the user and recognized by the controller 130. On the other hand, if the user operates the manipulation unit 150 to select the automatic scene determination mode, then the controller 130 automatically selects a mode from among landscape mode, portrait mode, nighttime mode, handheld nighttime mode, backlight mode, and so forth.

If the scene mode is the automatic scene determination mode (Yes in S402), the controller 130 recognizes the image data produced by the CCD image sensor 120 (sensor image data) (S406). The controller 130 then performs automatic scene determination on the basis of the sensor image data (S407). As a result of this automatic determination, the controller 130 automatically selects and sets the mode best suited to the current situation from among a plurality of scene modes, such as landscape mode, portrait mode, nighttime mode, handheld nighttime mode, and backlight mode. This processing is all executed by the scene determination unit 130a.

Then, the image processor 122 produces display-use image data by subjecting the sensor image data to processing corresponding to the scene mode set by the controller 130. A through-image is then displayed on the liquid crystal monitor 123 on the basis of this display-use image data (S409).

Here, if the user has pressed the still picture release button 201, the controller 130 detects that the still picture release button 201 has been pressed (S410). At this point the controller 130 refers to the automatically determined and set scene mode (S411). In this embodiment, the description will focus on a case in which the scene mode is the backlight mode, but similar processing is carried out in other scene modes.

If the scene mode is backlight mode (Yes in S411), the controller 130 performs processing to produce recording-use image data in backlight mode (S412). The controller 130 produces recording-use image data in backlight mode by continuous combination processing. More precisely, the controller 130 performs processing to acquire two sets of image data of different exposures, and combine these to produce a single set of image data. This processing is executed by the number decision component 130b. Image data of the proper brightness from bright to dark regions can be produced by thus combining image data of different exposures.

The controller 130 first issues a command for under-exposure to the optical system 110 in order to acquire the first set of image data. When an imaging operation is performed at this setting, image data is obtained in which the region of the image data that is relatively bright is closer to the proper exposure. The image processor 122 subjects the image data outputted from the AFE 121 to image processing suited to a dark region. The controller 130 then stores the image data in the buffer memory 124.

Then, the controller 130 issues a command for over-exposure to the optical system 110 in order to acquire the second set of image data. When an imaging operation is performed at this setting, image data is obtained in which the region of the image data that is relatively dark is closer to the proper exposure. The image processor 122 subjects the image data outputted from the AFE 121 to image processing suited to a bright region. The image combination unit 122a produces recording-use image data by combining the two sets of image data stored in the buffer memory 124.

If the scene mode has been set to a mode other than the backlight mode (No in S411), the image processor 122 executes image processing suited to various scene modes other than the backlight mode, and produces recording-use image data (S413). For instance, when portrait mode has been determined, recording-use image data is produced by performing image processing so that the person's skin tone has a natural coloring.

Once recording-use image data corresponding to the various scene modes has been produced, the controller 130 records the recording-use image data to a recording component, such as the memory card 140 (S414). After this, the controller 130 again executes processing that refers to the mode (imaging mode or reproduction mode) set with the mode switch 207 (S401). The above series of operations is repeated until the user either changes the mode switch 207 to reproduction mode (No in S401) or turns off the power.

Meanwhile, if the scene mode has been set to a mode other than automatic scene determination mode (No in S402), the controller 130 recognizes the sensor image data (S426). The image processor 122 then produces display-use image data by subjecting the sensor image data to processing corresponding to the scene mode set by the controller 130. A through-image is thereby displayed on the liquid crystal monitor 123 on the basis of this display-use image data (S429).

Here, if the user has pressed the still picture release button 201, the controller 130 detects that the still picture release button 201 has been pressed (S430). At this point the controller 130 refers to the scene mode set with the manipulation unit 150 (S431).

If the scene mode is the backlight mode (Yes in S431), the controller 130 performs processing to produce recording-use image data in backlight mode (S432). The controller 130 produces recording-use image data in backlight mode by continuous combination processing. More precisely, the controller 130 performs processing to acquire three sets of image data of different exposures, and combine these to produce a single set of image data. This processing is executed by the number decision component 130b.

The reason that the number of combined images above is different from that when the scene mode was the automatic scene determination mode (Yes in S402) is that preference is given to the quality of the image being produced.

When continuous combination processing is performed in an environment with a large brightness difference, such as when the subject is backlit, the more sets of image data there are with different exposures, the more natural the coloring will be of the image from dark to bright areas. However, processing to combine the image data takes longer with more sets of image data. On the other hand, in automatic scene determination mode, the digital camera 100 performs imaging by selecting the proper scene mode according to the subject to be captured. Therefore, the less time it takes to acquire one set of recording-use image data, the sooner the user can capture the next image.

In view of this, the digital camera 100 in this embodiment produces recording-use image data from two sets of image data in order to shorten as much as possible how long it takes to acquire recording-use image data when the digital camera 100 has selected backlight mode and when the scene mode is the automatic scene determination mode (Yes in S402). On the other hand, if the user has set backlight mode as the scene mode with the manipulation unit 150, image quality is given preference and recording-use image data is produced from three sets of image data (rather than just two).

The controller 130 first issues a command for under-exposure to the optical system 110 in order to acquire the first set of image data. When an imaging operation is performed at this setting, image data is obtained in which the region of the image data that is relatively bright is closer to the proper exposure. The image processor 122 subjects the image data outputted from the AFE 121 to image processing suited to a dark region. The controller 130 then stores the image data in the buffer memory 124.

Then, the controller 130 issues a command for medium-exposure between under-exposure and over-exposure to the optical system 110 in order to acquire the second set of image data. When an imaging operation is performed at this setting, image data is obtained in which the region of the image data that has medium brightness is closer to the proper exposure. The image processor 122 subjects the image data outputted from the AFE 121 to image processing suited to a region of medium brightness. The controller 130 then stores the image data in the buffer memory 124.

Then, the controller 130 issues a command for over-exposure to the optical system 110 in order to acquire the third set of image data. When an imaging operation is performed at this setting, image data is obtained in which the region of the image data that is relatively bright is closer to the proper exposure. The image processor 122 subjects the image data outputted from the AFE 121 to image processing suited to a bright region, and stores it in the buffer memory 124. The image combination unit 122a produces recording-use image data by combining the three sets of image data stored in the buffer memory 124.

If the scene mode has been set to a mode other than the backlight mode (No in S431), the controller 130 refers to the various scene modes that have been set. The image processor 122 executes image processing suited to various scene modes other than the backlight mode, and produces recording-use image data (S433). For instance, when portrait mode has been determined, recording-use image data is produced by performing image processing so that the person's skin tone has a natural coloring.

When recording-use image data corresponding to the various scene modes are produced, the controller 130 executes processing to record the recording-use image data to a recording component, such as the memory card 140 (S434). After this, the controller 130 again executes processing to refer to the mode (imaging mode or reproduction mode) set with the mode switch 207 (S401). The above series of operations is repeated until the user either changes the mode switch 207 to reproduction mode (No in S401) or turns off the power.

3. Features

With the above embodiment, the controller 130 executes processing to capture and combine two images of different exposure when the scene mode is determined to be automatic scene determination mode and backlight mode (first combination imaging mode). In this case, the number of images that are combined is less than when the scene mode is the backlight mode set by the user, so the amount of time combination processing takes can be reduced. Consequently, the user can quickly carry out the next operation, without missing a photo opportunity, while ensuring an image that is suited to a backlit environment. Specifically, the user can quickly carry out the next operation while ensuring image quality that is suited to a backlit environment.

Meanwhile, in the above embodiment, the controller 130 executes processing to capture and combine three sets of image data of different exposures when the scene mode is determined to be backlight mode set by the user (second combination imaging mode). In this case, although there are more images to be combined than when the scene mode is automatic scene determination mode and backlight mode, an image of better quality can be produced in a backlit environment. Specifically, the user can produce an image of natural coloring, from bright to dark areas, in an environment with a large brightness difference.

Other Embodiments

An embodiment of the present technology was described above, but the present technology is not limited to or by the above embodiment, and various modifications are possible without departing from the gist of the technology. In particular, the embodiments and modification examples given in this Specification can be combined as needed.

The following are examples of other embodiments.

(A) In the above embodiment, recording-use image data was produced form two sets of image data by processing to produce recording-use image data in backlight mode (S412) when the scene mode was automatic scene determination mode (Yes in S402). Also, recording-use image data was produced from three sets of image data by processing to produce recording-use image data in backlight mode (S432) when the user had selected backlight mode as the scene mode. Here, the numbers of images used in this production may be any number so long as there are more when backlight mode is used as the scene mode than when automatic scene determination mode is used. Also, the exposure setting in acquiring a plurality of sets of image data does not necessarily have to be over-exposure or under-exposure. The exposure setting may be suitably varied according to the environment of the subject.

(B) In the above embodiment, when the controller 130 determined to use backlight mode in the automatic scene determination mode (Yes in S411), the number of captures (=the number of combinations) was less than when the user selected backlight mode as the scene mode (Yes in S431). However, the number of captures may be the same for both, and just the number of combinations may be less. In this case, since the number of captures is the same, the time that capture takes will also be the same, but the time that combination processing takes can be reduced by an amount corresponding to the reduction in the number of combinations.

(C) In the above embodiment, backlight mode was described as an example of a mode for performing continuous combination processing. However, the mode for performing continuous combination processing is not limited to backlight mode, and may be any mode as long as it is a mode in which a plurality of images are captured and combined. For instance, the present technology can also be applied to handheld nighttime mode (imaging in a low-illumination environment). Handheld nighttime mode is a mode suited to imaging in a low-illumination environment, such as capturing a nighttime landscape. In a low-illumination environment, the exposure time has to be increased in order to obtain the proper exposure, and a longer exposure time makes it more likely that blurred image data will be obtained due to camera shake. In view of this, in handheld nighttime mode, a plurality of sets of image data are captured at an exposure time short enough that blurring will not occur (there is a high probability that each individual set of image data will be under-exposed), and these sets are combined to obtain image data of the proper exposure. When the controller 130 determines that handheld nighttime mode is used in automatic scene determination mode, the same effect as above can be obtained by reducing the number of combinations below that when the user has selected handheld nighttime mode as the scene mode.

(D) In the above embodiment, if backlight mode is selected in automatic scene determination mode (Yes in S411), recording-use image data in backlight mode was produced. Instead of this, the configuration may be such that it is determined whether or not to execute combination processing in backlight mode, and if the determination is to execute combination processing, recording-use image data in backlight mode is produced.

Figure 5:
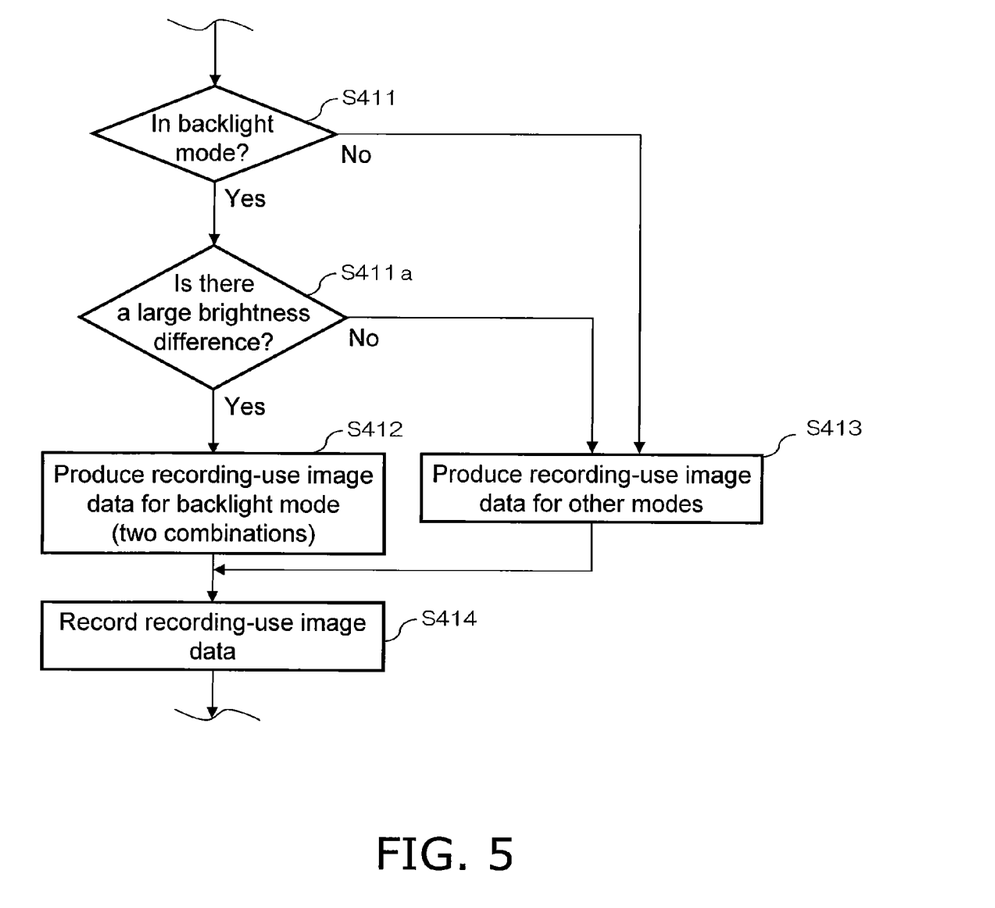
FIG. 5 is a flowchart showing the flow of processing by the digital camera in imaging mode in another embodiment.

In this case, as shown in FIG. 5, for example, the controller 130 determines whether or not the brightness difference is greater than a specific brightness difference (S411a). Here, the configuration may be such that combination processing is executed if the brightness difference is greater than a specific brightness difference (Yes in S411a) (S412).

On the other hand, if the brightness difference is equal to or less than a specific brightness difference (No in S411a), step 413 (S413) is executed. In this case, step 413 (S413) includes "producing one set of recording-use image data without using a flash," "producing one set of image data using a flash," and so forth.

In this case, since the determination of whether or not to execute combination processing has to be further executed, there is the risk that the processing time will end up being longer. Here again, however, since the number of captures is less than with a user setting, the overall processing time will be shorter than with a user setting.

The basic configuration given here is the same as that in the above embodiment, so only the portions that are different from the above embodiment are selected for display in FIG. 5.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the imaging device. Accordingly, these terms, as utilized to describe the present technology should be interpreted relative to the imaging device.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired.

Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

Industrial Applicability

The present technology makes an imaging device capable of continuous combination processing more convenient to use, and therefore can be utilized in digital still cameras, digital video cameras, portable telephones, smart phones, and so forth.

What is claimed is:

1. An imaging device comprising:
   an imaging component configured to capture a subject image and output image data;
   an imaging mode input component configured to select an automatic determination mode in which one of a plurality of imaging modes is automatically decided on, and a selection mode in which one of a plurality of imaging modes is selectively decided on;
   an imaging mode selector configured to select a first combination imaging mode or a first non-combination imaging mode based on whether or not the imaging mode decided in the automatic determination mode is a specific imaging mode, or select a second combination imaging mode or a second non-combination imaging mode based on whether or not the imaging mode decided in the selection mode is the specific imaging mode, each of the first combination imaging mode and second combination imaging mode being a mode in which plural sets of image data are captured and combined, each of the first non-combination imaging mode and second non-combination imaging mode being a mode in which plural sets of image data are not combined; and
   a number decision component configured to set a number of sets of image data to be combined to a specific first number of combinations if the first combination imaging mode is selected, and set the number of sets of image data to be combined to a specific second number of combinations if the second combination imaging mode is selected, the first number of combinations is set to be different from the second number of combinations.

2. The imaging device according to claim 1, wherein the first number of combinations is set to be less than the second number of combinations.

3. The imaging device according to claim 1, wherein, if the automatic determination mode is selected, a first number of image captures is greater than or equal to the first number of combinations, the first number of image captures being a number of image data captured in the first combination imaging mode.

4. The imaging device according to claim 3, wherein the first number of image captures is the same as the first number of combinations.

5. The imaging device according to claim 1, wherein, if the selection mode is selected, a second number of image captures is greater than or equal to the second number of combinations, the second number of image captures being a number of image data captured in the second combination imaging mode.

6. The imaging device according to claim 5, wherein the second number of image captures is the same as the second number of combinations.

7. The imaging device according to claim 1, further comprising:
   a combination processor configured to combine image data, a number of the image data to be combined is the first number of combinations of image data set by the number decision component.

8. The imaging device according to claim 1, wherein one of the plurality of image modes in each of the automatic determination mode and the selection mode is a backlight mode and the specific image mode is the backlight mode.

9. An imaging method comprising:
   capturing a subject image and outputting image data;
   selecting an automatic determination mode in which one of a plurality of imaging modes is automatically decided on, or a selection mode in which one of a plurality of imaging modes is selectively decided on;
   selecting a first combination imaging mode or a first non-combination imaging mode based on whether or not the imaging mode decided in the automatic determination mode is a specific imaging mode, or selecting a second combination imaging mode or a second non-combination imaging mode based on whether or not the imaging mode decided in the selection mode is the specific imaging mode, each of the first combination imaging mode and second combination imaging mode being a mode in which plural sets of image data are captured and combined, each of the first non-combination imaging mode and second non-combination imaging mode being a mode in which plural sets of image data are not combined; and
   setting a number of sets of image data to be combined to a specific first number of combinations if the first combination imaging mode is selected, and setting the number of sets of image data to be combined to a specific second number of combinations if the second combination imaging mode is selected, the first number of combinations is set to be different from the second number of combinations.

10. The imaging method according to claim 9, wherein one of the plurality of image modes in each of the automatic determination mode and the selection mode is a backlight mode and the specific image mode is the backlight mode.

* * * * *